United States Patent [19]

Wolf et al.

[11] 4,406,963

[45] Sep. 27, 1983

[54] ELECTRICAL MACHINE

[75] Inventors: Peter Wolf, Lucerne; Hugo Fritschy, Sachseln, both of Switzerland

[73] Assignee: Interelectric AG, Sachseln, Fed. Rep. of Germany

[21] Appl. No.: 229,491

[22] Filed: Jan. 29, 1981

Related U.S. Application Data

[63] Continuation of Ser. No. 950,855, Oct. 12, 1978, abandoned.

[30] Foreign Application Priority Data

Oct. 28, 1977 [DE] Fed. Rep. of Germany ....... 2748550

[51] Int. Cl.³ ............................................ H02K 13/00
[52] U.S. Cl. .................................... 310/239; 310/90; 310/242; 310/247
[58] Field of Search ................. 310/238, 239, 241, 51, 310/242, 245–247, 191, 232, 233, 90, 89, 91

[56] References Cited

U.S. PATENT DOCUMENTS

| 1,157,963 | 10/1915 | Shaw | 310/241 |
|---|---|---|---|
| 2,135,303 | 5/1934 | Greene | 310/247 |
| 2,679,606 | 5/1954 | Baudry et al. | 310/239 X |
| 3,525,891 | 8/1970 | Lukawich et al. | 310/239 |
| 3,558,949 | 1/1971 | Evans | 310/239 |
| 3,579,007 | 5/1971 | Walter | 310/242 |
| 3,740,598 | 6/1973 | Hallerback | 310/90 |
| 4,115,713 | 9/1978 | La Costa | 310/90 |

FOREIGN PATENT DOCUMENTS

| 1126985 | 4/1962 | Fed. Rep. of Germany | 310/239 |
|---|---|---|---|
| 1182735 | 12/1964 | Fed. Rep. of Germany | 310/239 |
| 1275194 | 8/1968 | Fed. Rep. of Germany | 310/247 |
| 2533535 | 1/1977 | Fed. Rep. of Germany | 310/239 |
| 2067713 | 8/1971 | France | 310/239 |
| 2082381 | 12/1971 | France | 310/239 |

Primary Examiner—R. Skudy
Attorney, Agent, or Firm—Jones, Tullar & Cooper

[57] ABSTRACT

An electrical machine having an armature that is rotatable in a stator. The armature has a winding that is energized via a commutator or via slip rings cooperating with brushes. A holding plate is provided on which the brushes are held and which is supported freely shiftable in the direction of the axis of rotation of the machine, but circumferentially immovable. The holding plate butts against a part that is supported axially immovable on the shaft of the armature, preferably a bearing. Spring means acting between the holding plate and an adjacent side plate of the stator or housing serves to bias the holding plate in an axial direction. The part against which the holding plate butts, lies preferably in or near the plane of the holding plate.

9 Claims, 1 Drawing Figure

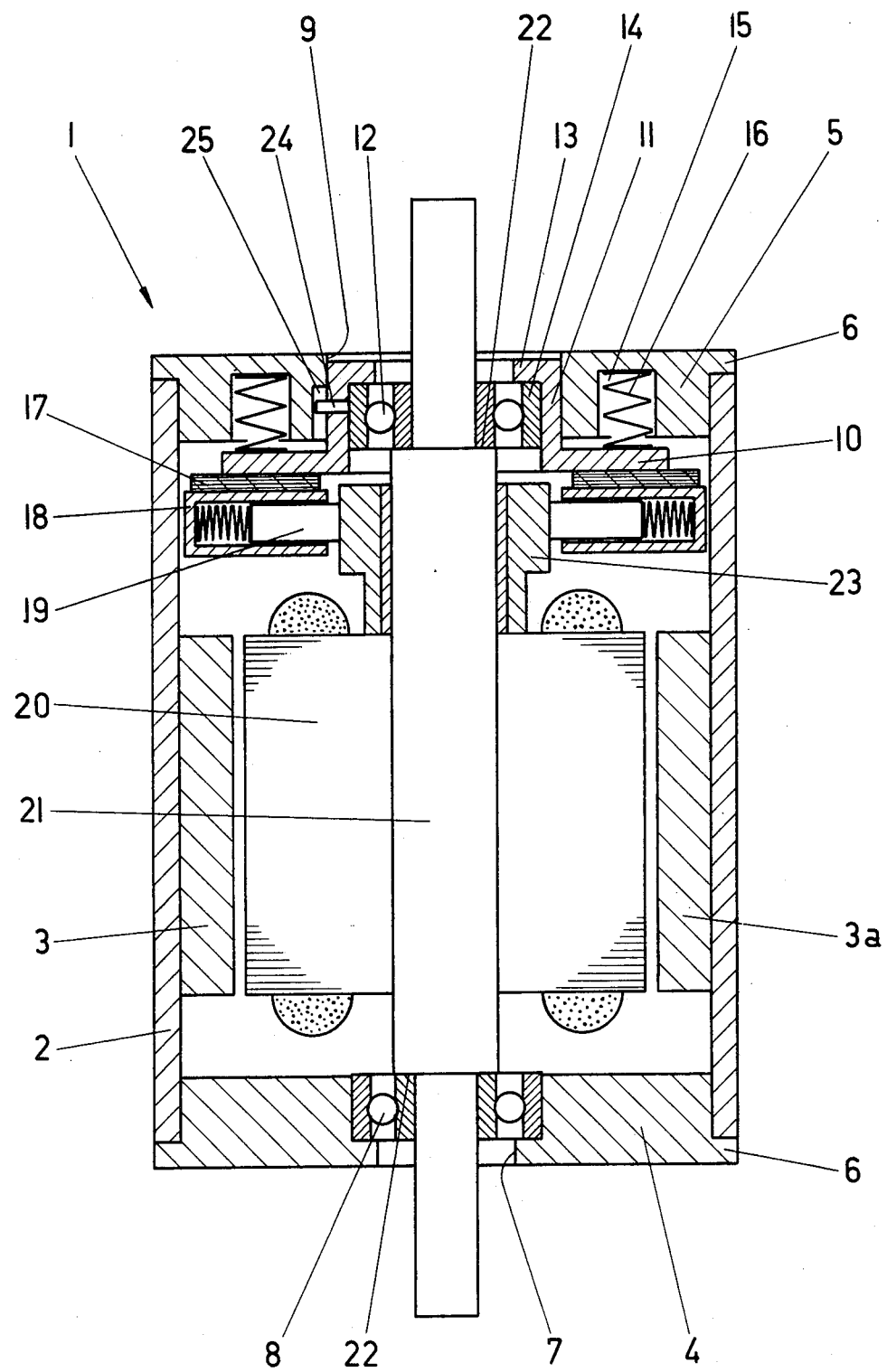

ELECTRICAL MACHINE

This is a continuation of application Ser. No. 950,855, filed Oct. 12, 1978, now abandoned.

BACKGROUND OF THE INVENTION

The invention relates to electrical machines of the kind having a stator and a rotatable armature, the winding of which is energized via a commutator or via slip rings. Such electrical machines are widely used as motors or as generators.

It has been found that in such machines the commutation performance is impaired after a long period of operation. Especially in small motors it may happen that the brushes cooperating with the commutator become damaged or broken.

It is therefore an object of the invention to improve an electrical machine of the kind referred to such that the commutation performance is not impaired even after a long period of operation.

It is another object of the invention to provide an electrical machine in which the brushes do not become damaged due to a relative axial displacement between the commutator on the one hand and the brushes on the other hand.

BRIEF SUMMARY OF THE INVENTION

Those and other objects are achieved by an electrical machine in which the brushes are held by a holding plate, which in turn is supported so as to be axially freely shiftable but circumferentially stationary with respect to the axis of the machine. The holding plate butts against an element of the machine that is axially stationary with respect to the shaft of the armature or rotor. By means of this mounting arrangement, the brushes will follow any axial movement of the armature and of the commutator and thus will be in an axially stationary position unshiftable with respect to the commutator.

Preferably, the holding plate butts against an element of or on the rotor shaft that is in or near the plane in which the holding plate is positioned. By this, a different thermal expansion of the rotor shaft on the one hand and of the stator or housing of the machine on the other hand will not adversely affect the axial position of the brushes with respect to the commutator.

It has been found that after a long period of operation of an electrical machine having a commutator or a slip ring, the brushes form grooves in the same by abrasion at the contacting surface. In the electrical machine according to the invention it is assured that the brushes remain in thier initial axial position with respect to the commutator. Thus, when grooves are formed in the same after a long period of operation, the brushes are prevented from contacting only the rim of the grooves, which would cause increased sparking and a higher contact resistance. According to the invention, the brushes maintain an even contact with the surface of the commutator or of the slip rings, as the case may be, even if grooves have been formed on the same after a long period of operation. The most important advantages will be achieved in commutator machines, whereas in electrical machines having slip rings the favourable effect is not so significant; accordingly, the following detailed description has reference to commutator machines.

In a preferred embodiment, the holding plate butts against the rotor bearing which is provided nearest the holding plate and which should be capable of receiving axial forces. By this, the axial shifting of the brushes with respect to the commutator is considerably reduced or even totally eliminated.

Preferably, the holding plate may be resiliently biased towards the element against which the holding plate butts. By this, it is guaranteed that the axial play of the bearing of the rotor which supports the holding plate does not influence the relative axial position of the brushes with respect to the commutator.

It is advisable to provide at least two pressure springs between the holding plate and the adjacent end plate of the electrical machine in a circumferential equidistant relationship. The holding plate is thus biased without the risk of being tilted.

The maximum advantage will be achieved if the element or region of the rotor shaft, against which the holding plate butts, lies in or near the plane of the holding plate, since by this the effect of thermal expansion on the commutation performance is minimized.

In a specific embodiment, the holding plate comprises a central hollow hub, the inner wall of which receives one of the bearings of rotor and the outer wall of which slidingly fits within a correspondingly shaped recess of the corresponding end plate. The shiftability between the outer wall of the hollow hub on the one hand and the recess of the corresponding end plate on the other hand assures that the relative axial position of the brushes with respect to the commutator is maintained. The hollow hub may also comprise a radially inwardly projecting shoulder which serves as an abutment for the rotor bearing. A keyway coupling may be provided to prevent a relative rotational movement of the hollow hub with respect to the second end plate.

BRIEF DESCRIPTION OF THE DRAWING

The single FIGURE shows a longitudinal sectional view of an electrical machine according to the invention taken through the axis of rotation of the machine.

DETAILED DESCRIPTION OF A PREFERRED EMBODIMENT

The following description taken in connection with the accompanying drawing is directed to a preferred embodiment.

In the drawing there is shown an electrical machine 1 comprising a housing 2, at the inner wall of which an even number of permanent magnets are secured. In the specific embodiment illustrated, two diametrically opposing permanent magnets 3 and 3a are provided. A first, or front, end plate 4 is attached to one side of the tubular housing, and a second, or rear, end plate 5 is attached to the other side of the housing. Each of these end plates have a radially outwardly projecting shoulder 6 abutting against the corresponding end face of the housing 2, the end plates and the housing forming a stator frame for the machine 1.

The front end plate 4 is provided with a bore 7 which over a part of its length has an increased diameter and forms a seat for a ball bearing 8. The second or rear end plate 5 is provided with a central bore 9 which has a greater diameter than the outer diameter of the adjacent ball bearing 12 supporting the shaft 21 of the armature 20.

A circular holding plate 10 is provided which has a protruding hollow hub 11, the outer surface of which slidably fits in the central bore 9 and the inner surface of which snugly receives the ball bearing 12.

At its outwardly facing end, the hollow hub 11 is provided with a radially inwardly projecting shoulder 13 which serves as an abutment for the outwardly facing side face of the outer cage ring 14 of the ball bearing 12.

The rear end plate 5 is further provided with two diametrically opposed blind bores 15, which face into the interior of the machine. Each of these bores 15 is adapted to receive a pressure spring 16, the spring exerting a biasing pressure against the holding plate 10.

In the embodiment shown, the holding plate 10 is made of metal. Its side facing the armature carries support members, or spacers, 17 made from an insulating material, and each of these members holds a brush receptacle 18, into which a brush 19 and a spring fixed thereto is inserted. Each of the receptacles 18 is provided with a connecting tag, or electrical lead (not shown).

The shaft 21 supporting the rotor or armature 20 is rotatably held in the ball bearings 8 and 12 and is of a reduced diameter at its end portions, so that shoulders 22 are formed which serve as abutments for the inner cage rings of the ball bearings 8 and 12.

The armature 20 includes windings 20' which are connected to commutator 23 in conventional manner. The commutator is mounted on shaft 21 adjacent the armature in conventional manner and cooperates with the brushes 19.

The the exerted by pressure springs 16 tends to displace the holding plate 10 to the left as seen in the FIGURE. This axial displacement is restricted, however, by the ball bearing 12, which concurrently acts as a radial as well as an axial bearing. By the action of the pressure springs 16 the effect of any axial play of the ball bearing 12 on the relative axial position of the brushes 19 with respect to the commutator 23 is eliminated. If the shaft and the commutator fixed thereto moves axially, the ball bearing 12 and the holding plate 10 supporting the brushes will be displaced in the same amount.

Instead of ball bearings, any other bearing may be used that is adapted to transmit the small axial load of the springs 16.

It is advantageous to arrange the pressure springs in an equidistant angular relationship to one another so as to avoid the exertion of tiliting forces on the holding plate 10.

If bearings are used having a minute or neglectable axial play, the pressure springs may alternatively be omitted.

The sliding fit of the hollow hub 11 in the second end plate 5 should be as easy-going as possible in order not to jeopardize the free axial movement of the holding plate, which of course must be held circumferentially immovable, for instance by providing a pin 24 fitted in the hollow hub 11 and extending into a longitudinal groove 25 formed in the second end plate.

The invention is not limited to the aforementioned embodiment, but can be realized in any kind of electrical machines having commutators or slip rings and brushes of any kind cooperating therewith. The invention is also applicable to electrical machines, in which the rotor is adapted to perform a desired axial movement.

We claim:
1. An electrical machine comprising:
a stator frame having first and second end plates;
first and second bearings located in said first and second end plates, respectively;
an armature having a shaft which is rotatably mounted in said first and second bearings, and a winding on said armature;
a commutator mounted on said shaft and connected to said armature winding;
a holding plate supported in said stator frame, said holding plate being axially movable along the axis of rotation of said rotor, and being circumferentially immovable with respect to said stator frame, said holding plate having a central hollow hub, the inner wall of said hub receiving said second bearing and the outer wall of said hub being mounted in a recessed portion of said second end plate, said hub having a radially inwardly projecting shoulder, a side face of said shoulder abutting said second bearing, said second bearing being axially immovable with respect to said shaft; and
brushes mounted on said holding plate and cooperating with said commutator.

2. An electrical machine comprising:
a stator frame having first and second end plates;
first and second bearings located in said first and second end plates, respectively;
an armature having a shaft which is rotatably mounted in said first and second bearings, and a winding on said armature;
a commutator mounted on said shaft and connected to said armature winding;
a holding plate having a hollow hub, said hub being adapted to receive said second bearing whereby said holding plate is coaxially supported with respect to said shaft, said holding plate being displaceable along the axis of rotation of said shaft;
a retaining pin fitted in said hub and extending into a longitudinal slot in said second end plate, said pin thereby preventing circumferential movement of said holding plate with respect to said stator frame; and
brushes mounted on said holding plate and cooperating with said commutator to energize said armature winding.

3. The electrical machine of claim 2, wherein said second bearing is capable of receiving axial forces, and wherein said holding plate abuts axially against said second bearing.

4. The electrical machine of claim 3 wherein said second bearing is a combined radial and axial bearing for supporting said armature in said stator frame.

5. The electrical machine of claim 2, further including biasing means for biasing said holding plate toward said armature.

6. The electrical machine of claim 5 wherein said biasing means includes at least two springs are positioned between said holding plate and said second end plate.

7. The electrical machine of claim 2, wherein said second end plate includes an axial recess, and wherein said hollow hub has an inner wall adapted to engage said second bearing and an outer wall adapted to be received in said recess in said second end plate.

8. The electrical machine of claim 7 wherein said hollow hub further includes a radially inwardly projecting shoulder having a side face abutting said second bearing.

9. An electrical machine comprising:
housing means;

stator means supported in said housing means;
bearing means;
means supporting said bearing means in said housing means;
a rotor having a shaft rotatably mounted in said bearing means, said rotor including armature windings energizable by way of a commutator carried on said shaft;
brush means adapted to contact said commutator; and
a brush holding plate supporting said brush means, said brush holding plate being mounted for axial motion with respect to said stator and abutting an element that is axially immovable with respect to said rotor, and being so mounted as to be circumferentially immovable with respect to said stator and said rotor.

* * * * *